United States Patent
Demerly et al.

(10) Patent No.: US 12,326,728 B2
(45) Date of Patent: Jun. 10, 2025

(54) SYSTEM AND METHOD TO CONTROL THE VELOCITY AND HEADING OF A VEHICLE BASED ON PREVIEW INFORMATION

(71) Applicant: Arriver Software LLC, Novi, MI (US)

(72) Inventors: Jon D. Demerly, Byron, MI (US); Hsin-Hsiang Yang, Ann Arbor, MI (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 16/362,142

(22) Filed: Mar. 22, 2019

(65) Prior Publication Data

US 2020/0301420 A1    Sep. 24, 2020

(51) Int. Cl.
   *G05D 1/00*       (2024.01)
(52) U.S. Cl.
   CPC ......... *G05D 1/0088* (2013.01); *G05D 1/0223* (2013.01)
(58) Field of Classification Search
   CPC ................. G05D 1/0088; G05D 1/022; G05D 2201/0213
   See application file for complete search history.

(56) References Cited

U.S. PATENT DOCUMENTS

| | | | |
|---|---|---|---|
| 7,831,353 B1 * | 11/2010 | Barron ................. | B60G 17/018 701/37 |
| 9,731,755 B1 * | 8/2017 | Moshchuk ............... | B62D 6/00 |
| 2009/0037062 A1 | 2/2009 | Lee et al. | |
| 2009/0088918 A1 * | 4/2009 | Takenaka ............ | B60T 8/17551 701/31.4 |
| 2011/0270474 A1 | 11/2011 | Builta et al. | |

(Continued)

FOREIGN PATENT DOCUMENTS

| CN | 103442970 A | 12/2013 |
|---|---|---|
| CN | 104691609 A | 6/2015 |

(Continued)

OTHER PUBLICATIONS

International Search Report (ISR) issued in corresponding PCT application PCT/US2020/023861 Jun. 19, 2020.

(Continued)

*Primary Examiner* — Jelani A Smith
*Assistant Examiner* — Toya Pettiegrew
(74) *Attorney, Agent, or Firm* — QUALCOMM Incorporated

(57) ABSTRACT

A system and method for controlling the velocity and heading of a vehicle includes a processor, a steering controller in communication with the processor, and a speed controller in communication with the processor. The steering controller is arranged within the vehicle and is configured to control the steering angle of the vehicle. The speed controller is arranged within the vehicle and is configured to control the velocity of the vehicle. The processor is configured to receive an array of control commands, the array of control commands include steering angle positions and velocities of the vehicle for a present time and a preview time and generate a control request for instructing the steering controller and the speed controller based on the steering angle positions and velocities of the vehicle for both the present time and the preview time.

15 Claims, 5 Drawing Sheets

(56) References Cited

U.S. PATENT DOCUMENTS

| | | | |
|---|---|---|---|
| 2014/0012469 A1* | 1/2014 | Kunihiro | B62D 6/001 701/41 |
| 2014/0044311 A1* | 2/2014 | Takahashi | G01S 13/931 382/103 |
| 2014/0214275 A1 | 7/2014 | Miller et al. | |
| 2015/0158524 A1* | 6/2015 | Lee | B62D 6/001 701/41 |
| 2015/0323660 A1 | 11/2015 | Hampikian | |
| 2018/0001926 A1 | 1/2018 | Swieter | |
| 2018/0057002 A1* | 3/2018 | Lee | B60W 60/00276 |
| 2018/0354513 A1 | 12/2018 | Moshchuk et al. | |
| 2018/0356830 A1* | 12/2018 | Haghighat | H04L 67/306 |
| 2019/0185053 A1* | 6/2019 | Wuthishuwong | B62D 6/008 |
| 2019/0291728 A1* | 9/2019 | Shalev-Shwartz | B60W 50/087 |
| 2020/0019165 A1* | 1/2020 | Levandowski | G08G 1/096791 |
| 2020/0132488 A1* | 4/2020 | Slutskyy | B60W 60/0011 |
| 2020/0164745 A1* | 5/2020 | Mohan | F02D 29/02 |
| 2021/0004613 A1* | 1/2021 | Yang | G06V 10/454 |

FOREIGN PATENT DOCUMENTS

| | | |
|---|---|---|
| CN | 107107948 A | 8/2017 |
| JP | 2015101152 A | 6/2015 |
| KR | 20180081266 A | 7/2018 |

OTHER PUBLICATIONS

Li et al. "An adaptive preview path tracker for off-road autonomous driving." In: 2013 10th IEEE 1-10 International Conference on Control and Automation (ICCA). Jun. 2013 (Jun. 2013) Retrieved from <https://www.researchgate.net/profile/Qingyang_Chen3/publication/261345739_An_adaptive_preview_path_tracker_for_off- road_autonomous_driving/links/5e56012792851cefa1c48d06/An-adaptive-preview-path-tracker-for-off-road-autonomous-driving.pdf>.

* cited by examiner

SYSTEM AND METHOD TO CONTROL THE VELOCITY AND HEADING OF A VEHICLE BASED ON PREVIEW INFORMATION

BACKGROUND

1. Field of the Invention

The present invention generally relates to systems and methods for controlling the velocity and heading of a vehicle.

2. Description of Related Art

With regards to autonomous or semi-autonomous vehicles (highly autonomous), the control systems for these types of vehicles are commonly divided into two sub-modules. The first sub-module generally performs motion planning and the second sub-module generally performs vehicle dynamic control. The motion planning sub-module is responsible for generating a trajectory for the vehicle to maneuver in a complex environment. In order to efficiently generate the trajectory, the motion planning sub-module generally employs a simplified vehicle model. The simplified vehicle model may be a kinematic model.

The vehicle dynamic control sub-module is responsible for tracking the trajectory from the motion planning sub-module taking into account the more complex vehicle dynamic behavior. This complex vehicle dynamic behavior may include non-linearity and model uncertainty, among other things. Due to the inconsistencies between a simplified vehicle model utilized by the motion planning submodule and dynamic assumptions, there can be challenges with having smooth and reliable performance.

For example, it is generally preferred by passengers of autonomous vehicles that the autonomous vehicle pilot itself in such a way that the motion of the vehicle is smooth and fluid. As such, the control of the steering and the speed of the vehicle must be such that any changes of the steering (heading) or the speed (velocity) of the vehicle are done naturally and fluidly.

SUMMARY

A system and method for controlling the velocity and heading of a vehicle includes a processor, a steering controller in communication with the processor, and a speed controller in communication with the processor. The steering controller is arranged within the vehicle and is configured to control the steering angle of the vehicle. The speed controller is arranged within the vehicle and is configured to control the velocity of the vehicle. The processor is configured to receive an array of control commands, the array of control commands include steering angle positions and velocities of the vehicle for a present time and a preview time and generate a control request for instructing the steering controller and the speed controller based on the steering angle positions and velocities of the vehicle for both the present time and the preview time.

Further objects, features, and advantages of this invention will become readily apparent to persons skilled in the art after a review of the following description, with reference to the drawings and claims that are appended to and form a part of this specification.

DETAILED DESCRIPTION

Figure 1:
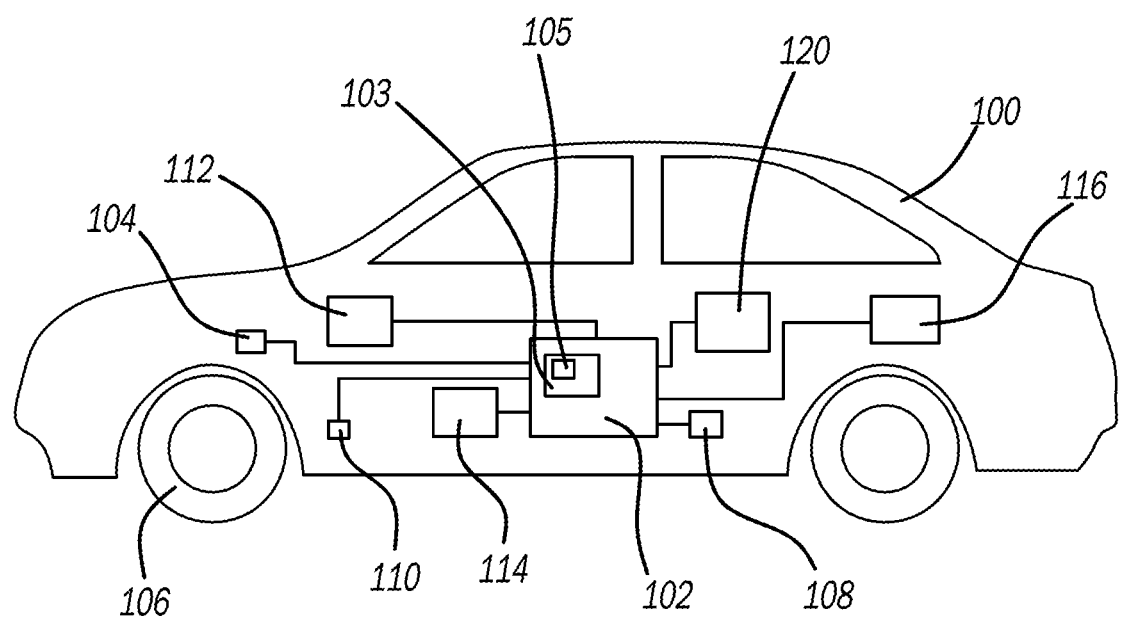
FIG. 1 illustrates a block diagram of a vehicle having a system for controlling the velocity and heading of the vehicle.

Referring to FIG. 1, a vehicle 100 is shown. It should be understood that the vehicle 100 could be any type of vehicle capable of transporting persons or items from one point to another. As such, the vehicle may be a car, truck, commercial vehicle, tractor-trailer, farm tractor, mining vehicle, and the like. Again, the vehicle 100 may be any type of vehicle so long as it is capable of transporting persons or items from one location to another.

Here, the vehicle 100 includes a processor 102. The processor 102 may be a single processor or may be multiple processors working in concert. Generally, the processor is arranged within the interior of the vehicle 100. The processor 102 may be separately connected to or may incorporate a memory device 103. Here, the memory device 103 is shown to be integrated within the processor 102, but it should be understood that the memory device 103 may be separate from the processor 102. The memory device 103 may be any type of memory device capable of storing digital information. As such, the memory device 103 may be a solid-state memory device, an optical memory device, a magnetic memory device, and the like. The memory device may include instructions 105 and/or other data, such as lookup tables. In the case of instructions, instructions may include executable code for executing any one of the methods disclosed in this specification.

The processor 102 may be connected to a number of different sensors for sensing different physical parameters of the vehicle. For example, the processor 102 may be in communication with the velocity sensor 104. The velocity sensor 104 may be a wheel speed sensor mounted and arranged within the vehicle 100 so as to be able to determine the wheel speed of at least one wheel 106 of the vehicle. Of course, it should be understood that the vehicle 100 may have multiple wheel speed sensors for each of the wheels.

Additionally, the vehicle 100 may include an accelerometer 108 also in communication with the processor 102. The accelerometer 108 is capable of determining the acceleration of the vehicle 100 and is mounted in the vehicle to accomplish this task. The accelerometer 108 may measure acceleration in any one of a number of directions including lateral and/or transverse acceleration. The vehicle 100 may also include a steering wheel angle sensor 110 configured to determine the steering wheel angle of the vehicle 100.

The processor 102 may be connected to a number of different vehicle systems capable of controlling the vehicle 100. For example, the processor 102 may be in communication with a steering control system 112. The steering control system 112 may be connected to a steering system that essentially controls the steering of the vehicle 100 based on instructions from the processor 102.

The processor 102 may also be in communication with a throttle control system 114. The throttle control system 114 is configured to control the throttle position of the engine of the vehicle. As the throttle position of the engine of the vehicle changes, the vehicle can be instructed to change speeds.

The processor 102 may also be in communication with the brake control system 116 that is configured to control the brakes of the vehicle. The brakes of the vehicle allow the vehicle to slow down and/or remain in a stopped position. The brake control system 116 receives instructions from the processor 102 and is able to actuate the vehicle brakes so as to slow the vehicle 100 down or keep it in a stopped position. It should be understood that the throttle control system 114 and the brake control system 116 may be incorporated within a single control unit. This may be because the ability to control the brakes and/or throttle the vehicle are both related to controlling the velocity of the vehicle.

The processor 102 may also be in communication with an autonomous vehicle control system 120 that provides instructions to the processor to relay these instructions to any which one of the vehicle control systems, such as the steering control system 112, throttle control system 114 and/or the braking control system 116. For example, the autonomous vehicle control system 120 may provide instructions to the processor 102 to accelerate the vehicle, slow down the vehicle, apply the brakes, and other commands. These commands may be arranged as an array of commands.

Figure 2:
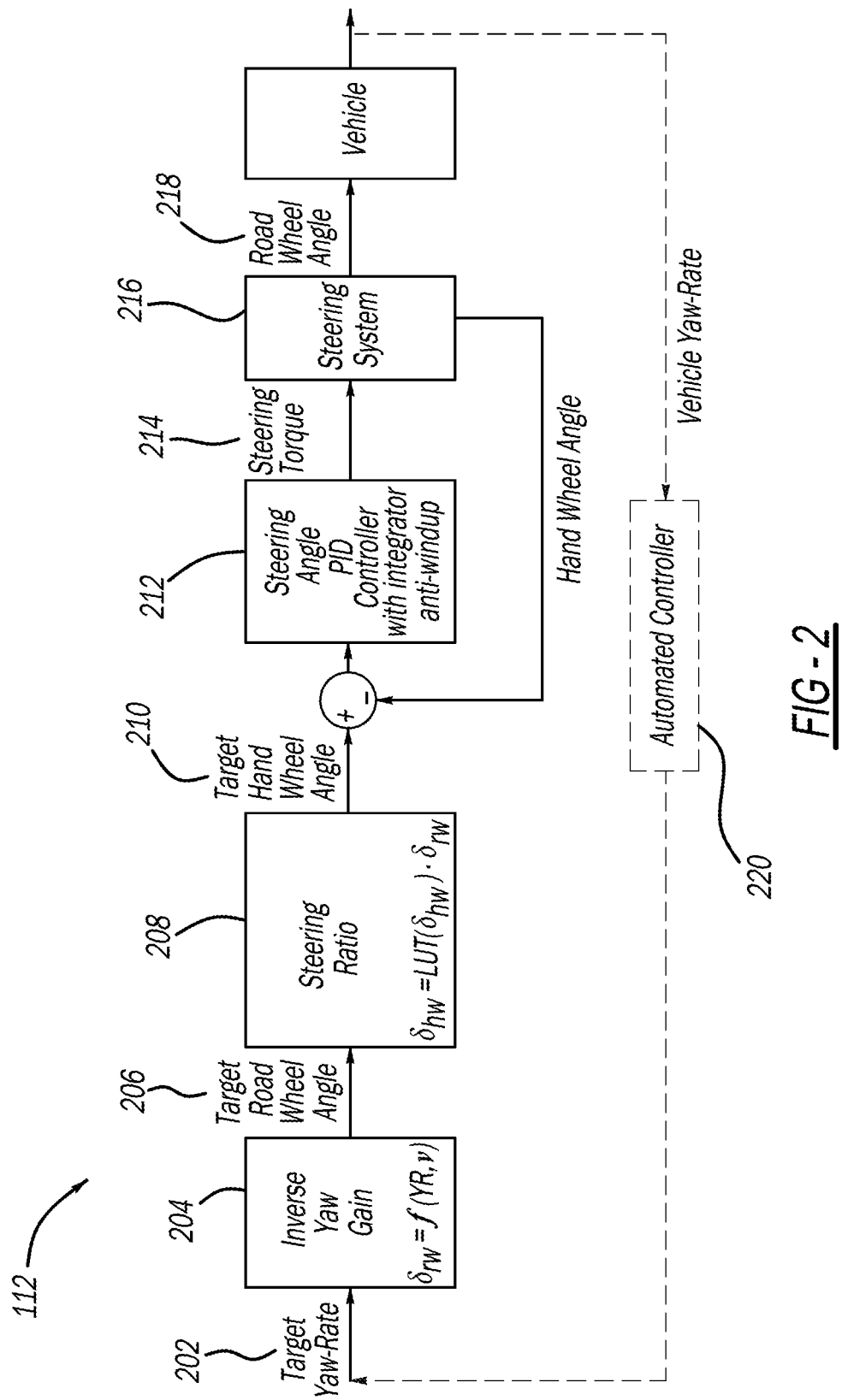
FIG. 2 illustrates a block diagram of a steering control system.

Referring to FIG. 2, a more detailed diagram of the steering control system 112 is shown. Here, the steering control system receives a target yaw rate 202 for the vehicle to be steered towards. An inverse yaw gain module 204 determines a target road wheel angle 206. The steering ratio module 208 takes the target road wheel angle 206 and creates a target hand wheel angle 210. From there, a steering angle controller 212 takes the target hand wheel angle 210 and determines an amount of torque 214 to apply to a steering system 216.

From there, as the steering system 216 steers the vehicle, the hand wheel angle changes and is fed back into the steering angle controller 212. An automated controller 220 may also be utilized to automate the vehicle yaw rate determination.

Figure 3:
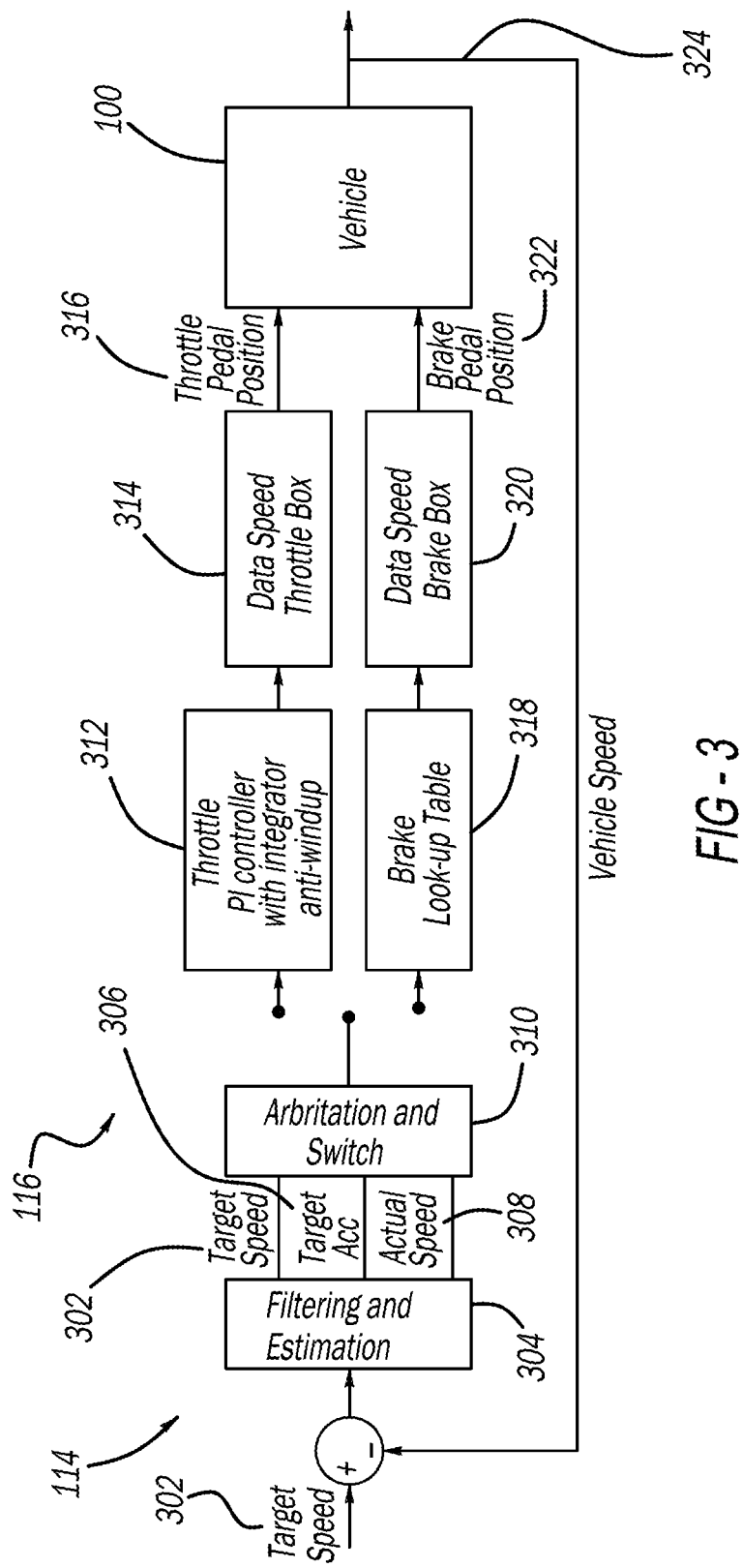
FIG. 3 illustrates a block diagram of a throttle control system and a brake control system.

Referring to FIG. 3, a more detailed view of the throttle control system 114 and brake control system 116 is shown. It could be understood that the throttle control system 114 and the brake control system 116 may be separate components or may be integrated together as shown in FIG. 3.

Here, a filtering and estimation module 304 receives a target speed 302. The filtering and estimation module 304 determines a target speed 302 and a target acceleration 306 from the target speed 302. In addition, the filtering and estimation module 304 determines the actual speed 308 that may be provided by the velocity sensor 104, which as stated previously, may be a wheel speed sensor.

Also shown is a switch 310 that determines if the throttle or brake should be controlled. This switch 310 may have the ability to control both the throttle and the brake at the same time. Here, the throttle controller 312 communicates to the throttle box 314 which then adjusts the throttle pedal position 316 of the vehicle 100. By adjusting the throttle position, the vehicle can be slowed down or sped up.

If the brake system is utilized, a brake look-up table 318 is utilized so as to determine how much force of the brake should be utilized based on the target speed 302, the target acceleration 306 and the actual speed 308. This look-up table provides the appropriate amount of brake pressure to the data speed brake box 320 which in turn adjusts the brake pedal position 322 of the vehicle 100. The brake lookup table may be stored within the memory device 103 of FIG. 1. As such, the brake of the vehicle can be applied and removed, and a certain amount of pressure can be applied to the brake pedal. This eventually results in a vehicle speed 324 which is then fed back into the filtering and estimation module 304.

Figure 4:
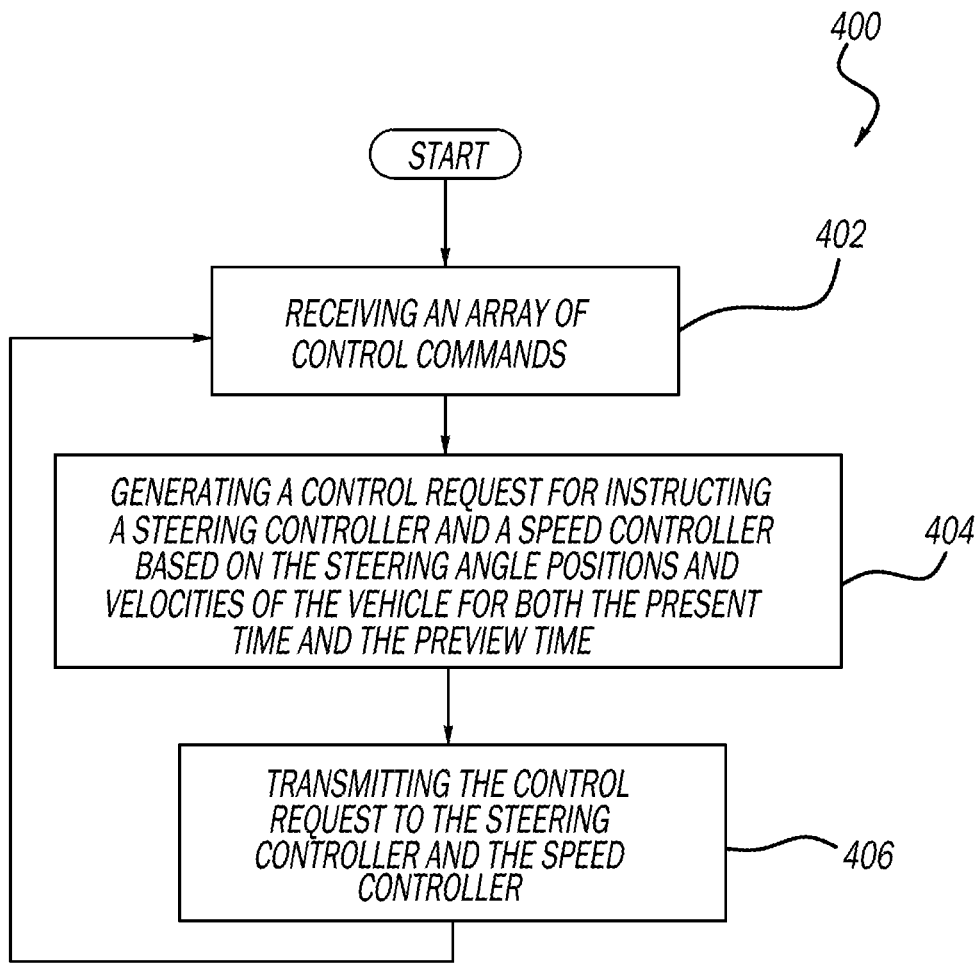
FIG. 4 illustrates a method for controlling the velocity and heading of the vehicle.

Referring to FIG. 4, a method 400 for controlling the vehicle 100 is shown. Here, in step 402, the processor 102 will receive an array of control commands. These control commands may come from the autonomous vehicle control system 120. In step 404, the processor is configured to generate a control request when instructing the steering control system 112 and a throttle control system 114 and/or brake control system 116 based on the steering angle positions and velocities of the vehicle for both present time and the preview time. The steering angle position may be determined by the steering wheel angle sensor 110 and the velocities may be determined by the velocity sensor 104.

The preview time is a time period from the present time to approximately two seconds.

Thereafter, in step 406, the processor of 102 is configured to transmit the control request to the steering control system 112 and the throttle control system 114 and/or the brake control system 116. Thereafter, the method then returns to step 402.

In addition to the steps shown in FIG. 4, the processor 102 may be further configured to generate the control request by filtering the steering angle positions for both the present time and the preview time. The processor 102 may also be configured to generate the control request by filtering the velocities for both the present time and the preview time.

Overall, as described above, the lateral and longitudinal control is based not only on current information but also preview information. An array of control commands generally includes instantaneous target commands and a look ahead for commands two seconds into the future. The control requests are modified based on the preview information to improve the control of the vehicle so that the vehicle operates in a smoother and more fluid-like manner.

The advantages to utilizing the system and method disclosed in this specification include providing an efficient computational method to smooth the trajectory from motion planning, emulating the naturalistic human driving behaviors, easy adaptation to different motion planning algorithms and vehicle dynamic control algorithms.

The array of control commands, stated previously, includes instantaneous target commands and a look ahead of approximately two seconds of future commands. These control commands could be expressed as:

$$u_{array} = \{u_{current}, u(t_i)\}, t_i = t_{current} + \Delta t \cdot i|_{i=1, \ldots, previous\ horizon}$$

this array of commands may be transmitted through an Ethernet UDP (user datagram protocol) package. The control commands may be modified based on preview information to improve control smoothness. This may be expressed as:

$$u_{array\_f} = \text{filt}(u_{array})$$

$$u_{preview} = w_{preview}^{(1 \times n)} \times u_{array\_f}^{(n \times 1)}$$

$$u_{control} = w_{filter}^{(1 \times m)} \times \{u_{preview}, u_{control}(k)|_{k=-1, \ldots, -m+1}\}$$

Figure 5:
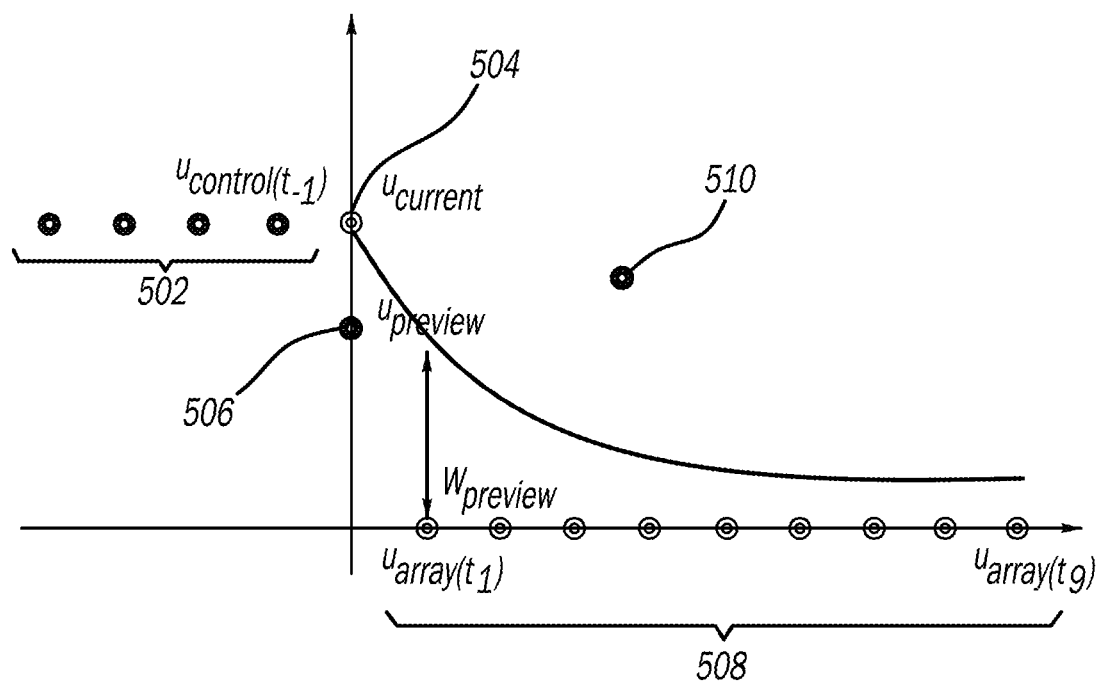
FIG. 5 illustrates a graphical representation for determining the velocity in the heading of the vehicle using preview information.

Referring to FIG. 5, a graphical representation of the preview control is shown. Here, a plurality of control commands previously executed are shown as elements 502. The current command is shown as element 504. The preview control command is shown as element 506. By looking ahead into the future as shown in future control elements 508, the vehicle can be piloted in such a way so as to allow the fluid and smooth direction of both the steering and acceleration of the vehicle. In addition, the processor 102 may be configured as to filter out control commands that appear to be outside of the norm. So, for example, if a control command 510 is shown, the processor 102 may filter out this command as being incorrect as is simply far off from the other elements 508.

In an alternative embodiment, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A system to control a speed and heading of a vehicle, the system comprising:
 a processor;
 a steering controller in communication with the processor and arranged within the vehicle, the steering controller being configured to control a steering angle of the vehicle;
 a speed controller in communication with the processor and arranged within the vehicle, the speed controller being configured to control the speed of the vehicle;
 wherein the processor is configured to receive an array of control commands including a present steering angle position, a future steering angle position, a present vehicle speed, and a future vehicle speed;
 wherein the processor is configured to generate a steering control request, for instructing the steering controller, based on the present steering angle position and the future steering angle position and to generate a speed control request, for instructing a brake control system of the speed controller, in accordance with a brake look-up table based on the present vehicle speed and the future vehicle speed, such that the steering control request controls a first transition between the present steering angle position and the future steering angle position, and the speed control request controls a second transition between the present vehicle speed and the future vehicle speed;
 wherein the processor is at least one of: configured to generate the steering control request by filtering the future steering angle position to filter out an outlier steering angle in response to the outlier steering angle position being out of a first norm of steering angle position values; or configured to generate the speed control request by filtering the future vehicle speed to filter out an outlier vehicle speed in response to the outlier vehicle speed being out of a second norm of vehicle speed values; and
 wherein the processor is configured to transmit the steering control request to the steering controller and the speed control request to the speed controller.

2. The system of claim 1, wherein the processor is further configured to generate the steering control request by filtering the present steering angle position and the future steering angle position.

3. The system of claim 1, wherein the processor is further configured to generate the speed control request by filtering the present vehicle speed and the future vehicle speed.

4. The system of claim 1, wherein the future steering angle position is an expected steering angle of the vehicle approximately two seconds into the future and the future vehicle speed is an expected speed of the vehicle approximately two seconds into the future.

5. A method to control a speed and heading of a vehicle, the method comprising:
 receiving an array of control commands, the array of control commands including a present steering angle position, a future steering angle position, a present vehicle speed, and a future vehicle speed;
 generating a steering control request, for instructing a steering controller of the vehicle, based on the present steering angle position and the future steering angle position, and generating a speed control request, for instructing a brake control system of a speed controller of the vehicle, in accordance with a brake look-up table based on the present vehicle speed and the future vehicle speed, such that the steering control request controls a first transition between the present steering angle position and the future steering angle position, and the speed control request controls a second transition between the present vehicle speed and the future vehicle speed; and
 transmitting the steering control request to the steering controller and the speed control request to the speed controller;
 wherein at least one of: generating the steering control request includes filtering the future steering angle position to filter out an outlier steering angle in response to the outlier steering angle position being out of a first norm of steering angle position values; or generating the speed control request includes filtering the future vehicle speed to filter out an outlier vehicle speed in response to the outlier vehicle speed being out of a second norm of vehicle speed values.

6. The method of claim 5, wherein generating the steering control request comprises filtering the present steering angle position and the future steering angle position.

7. The method of claim 5, wherein generating the speed control request comprises filtering the present vehicle speed and the future vehicle speed.

8. The method of claim 5, wherein the future steering angle position is an expected steering angle of the vehicle approximately two seconds into the future and the future vehicle speed is an expected speed of the vehicle approximately two seconds into the future.

9. The method of claim 5, wherein the steering controller is arranged within the vehicle, the steering controller being configured to control the steering angle of the vehicle.

10. The method of claim 5, wherein the speed controller is arranged within the vehicle, the speed controller being configured to control the speed of the vehicle.

11. The system of claim 1, wherein the processor is configured to determine the future steering angle position based on a received target yaw rate for the vehicle.

12. The system of claim 1, wherein the speed control request is a first speed control request, and wherein the processor is further configured to generate a second speed control request for instructing a throttle control system of the speed controller to adjust a throttle of the vehicle based on the present vehicle speed and the future vehicle speed.

13. The system of claim 1, wherein the processor is configured to generate the speed control request based further on a target acceleration of the vehicle.

14. The method of claim 5, wherein the speed control request is a first speed control request, and wherein the method further comprises generating a second speed control request for instructing a throttle control system of the speed controller to adjust a throttle of the vehicle based on the present vehicle speed and the future vehicle speed.

15. The method of claim 5, wherein the method comprises generating the speed control request based further on a target acceleration of the vehicle.

* * * * *